US008281114B2

(12) United States Patent
Linetsky (10) Patent No.: US 8,281,114 B2
(45) Date of Patent: Oct. 2, 2012

(54) SECURITY SYSTEM WITH METHODOLOGY FOR DEFENDING AGAINST SECURITY BREACHES OF PERIPHERAL DEVICES (75) Inventor: Gene Linetsky, Palo Alto, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1857 days.

(21) Appl. No.: 10/707,602

(22) Filed: Dec. 23, 2003

(65) Prior Publication Data
US 2005/0138433 A1 Jun. 23, 2005

(51) Int. Cl.
G06F 11/00 (2006.01)
G06F 9/00 (2006.01)
H04N 7/16 (2011.01)
G06F 12/14 (2006.01)

(52) U.S. Cl. .............. 713/2; 726/2; 726/22; 726/26; 710/15

(58) Field of Classification Search .................. None
See application file for complete search history.

(56) References Cited

U.S. PATENT DOCUMENTS

| | | | |
|---|---|---|---|
| 4,914,586 A | 4/1990 | Swinehart et al. | 707/101 |
| 5,355,414 A | 10/1994 | Hale et al. | 713/202 |
| 5,377,269 A | 12/1994 | Heptig et al. | 713/202 |
| 5,434,562 A | 7/1995 | Reardon | 713/200 |
| 5,475,817 A | 12/1995 | Waldo et al. | 709/316 |
| 5,586,260 A | 12/1996 | Hu | 713/201 |
| 5,623,601 A | 4/1997 | Vu | 713/201 |
| 5,687,379 A | 11/1997 | Smith et al. | 710/200 |
| 5,764,887 A | 6/1998 | Kells et al. | 713/200 |
| 5,815,574 A | 9/1998 | Fortinsky | 713/153 |
| 5,828,833 A | 10/1998 | Belville et al. | 713/201 |
| 5,832,211 A | 11/1998 | Blakley et al. | 713/202 |
| 5,838,903 A | 11/1998 | Blakely et al. | 713/202 |
| 5,857,191 A | 1/1999 | Blackwell et al. | 707/10 |
| 5,864,665 A | 1/1999 | Tran | 713/201 |
| 5,875,296 A | 2/1999 | Shi et al. | 713/202 |
| 5,881,230 A | 3/1999 | Christensen et al. | 709/203 |
| 5,887,131 A | 3/1999 | Angelo | 713/202 |
| 5,960,172 A | 9/1999 | Hwang | 713/200 |
| 5,963,142 A | 10/1999 | Zinsky et al. | 340/5.74 |
| 5,987,611 A | 11/1999 | Freund | 713/201 |
| 6,032,257 A * | 2/2000 | Olarig et al. | 726/35 |
| 6,088,802 A * | 7/2000 | Bialick et al. | 726/3 |
| 6,111,505 A | 8/2000 | Wagener | 340/568.1 |
| 6,141,774 A * | 10/2000 | Mattheis | 714/27 |
| 6,145,085 A | 11/2000 | Tran et al. | 713/202 |
| 6,190,257 B1 | 2/2001 | Takeda et al. | 463/29 |
| 6,212,635 B1 | 4/2001 | Reardon | 713/165 |
| 6,301,665 B1* | 10/2001 | Simonich et al. | 726/2 |
| 6,310,550 B1 | 10/2001 | Wagener | 340/568.1 |
| 6,394,905 B1 | 5/2002 | Takeda et al. | 463/29 |
| 6,542,995 B2 | 4/2003 | Heinrich et al. | 713/202 |
| 6,594,765 B2* | 7/2003 | Sherman et al. | 726/35 |

(Continued)

Primary Examiner — Nathan Flynn
Assistant Examiner — Trang Doan
(74) Attorney, Agent, or Firm — John A. Smart (57) ABSTRACT A security system with methodology for defending against security breaches of peripheral devices is described. In one embodiment, for example, a method is described for protecting a computer from security breaches involving devices that may be attached to the computer, the method comprises steps of: when a device is first attached to the computer, specifying authorization information indicating that the device is allowed to communicate with the computer; detecting detachment of the device from the computer; updating the authorization information to indicate that the device is no longer authorized to communicate with the computer; and upon reattachment of the device, blocking communication with the device while the device remains unauthorized, thereby preventing a security breach involving the device.

42 Claims, 6 Drawing Sheets

U.S. PATENT DOCUMENTS

| | | | |
|---|---|---|---|
| 6,641,484 B2 | 11/2003 | Oles et al. | 463/47 |
| 6,745,330 B1 | 6/2004 | Maillot | 713/200 |
| 6,839,776 B2 * | 1/2005 | Kaysen | 710/36 |
| 6,871,243 B2 * | 3/2005 | Iwase et al. | 710/62 |
| 6,912,663 B1 * | 6/2005 | Dayan et al. | 726/16 |
| 6,928,557 B1 * | 8/2005 | Inoue et al. | 726/35 |
| 6,963,935 B1 * | 11/2005 | Young et al. | 710/29 |
| 7,093,124 B2 * | 8/2006 | Girard | 713/164 |
| 7,240,369 B2 * | 7/2007 | Chou et al. | 726/27 |
| 2002/0194486 A1 * | 12/2002 | Heinrich et al. | 713/200 |
| 2003/0018892 A1 * | 1/2003 | Tello | 713/164 |
| 2003/0167376 A1 * | 9/2003 | Koh | 711/115 |
| 2003/0208698 A1 * | 11/2003 | Chou et al. | 713/202 |
| 2004/0030914 A1 * | 2/2004 | Kelley et al. | 713/200 |
| 2005/0015604 A1 * | 1/2005 | Sundararajan et al. | 713/184 |
| 2005/0021996 A1 * | 1/2005 | Howard | 713/200 |

\* cited by examiner

FIG. 5B ered by reference. For example, an end point security
SECURITY SYSTEM WITH METHODOLOGY FOR DEFENDING AGAINST SECURITY BREACHES OF PERIPHERAL DEVICES

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to defending computer systems against security breaches and, more particularly, to defending such systems against security breaches involving peripheral devices.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

With the ever-increasing popularity of the Internet, however, more and more computers are connected to larger networks. Providing access to vast stores of information, the Internet is typically accessed by users through Web "browsers" (e.g., Microsoft® Internet Explorer or Netscape Navigator) or other Internet applications. Browsers and other Internet applications include the ability to access a URL (Uniform Resource Locator) or "Web" site. In the last several years, the Internet has become pervasive and is used not only by corporations, but also by a large number of small business and individual users for a wide range of purposes.

As more and more computers are now connected to the Internet, either directly (e.g., over a dial-up or broadband connection with an Internet Service Provider or "ISP") or through a gateway between a LAN and the Internet, a whole new set of challenges face LAN administrators and individual users alike: these previously closed computing environments are now open to a worldwide network of computer systems. A particular set of challenges involves attacks by perpetrators (hackers) capable of damaging the local computer systems, misusing those systems, and/or stealing proprietary data and programs.

The software industry has, in response, introduced a number of products and technologies to address and minimize these threats, including "firewalls", proxy servers, and similar technologies—all designed to keep malicious users (e.g., hackers) from penetrating a computer system or corporate network. Firewalls are applications that intercept the data traffic at the gateway to a Wide Area Network ("WAN") and check the data packets (i.e., Internet Protocol packets or "IP packets") being exchanged for suspicious or unwanted activities.

Another security measure that has been utilized by many users is to install an end point security (or personal firewall) product on a computer system to control traffic into and out of the system. An end point security product can regulate all traffic into and out of a particular computer. One such product is assignee's ZoneAlarm® product that is described in detail in U.S. Pat. No. 5,987,611, the disclosure of which is hereby incorporated by reference. For example, an end point security product may permit specific "trusted" applications to access the Internet while denying access to other applications on a user's computer. To a large extent, restricting access to "trusted" applications is an effective security method. However, despite the effectiveness of end point security products, issues remain in protecting computer systems against attack by malicious users and applications.

One particular problem that remains is how to secure computers with detachable peripheral devices, particularly input devices such as keyboard and mouse input devices. These input devices, which are connected to computers having access to the Internet, are vulnerable to security breaches or attacks, such as "sniffing." For example, malicious software may be installed on an input device that looks for user names and passwords and, upon discovery, sends them to a potential attacker via the Internet. Although the foregoing problem most commonly occurs with keyboard and mouse input devices, the problem also extends to other peripheral devices or mechanisms that are detachable or transferable. This would include, for example, a peripheral storage device such as a detachable USB disk drive. Even though that device is not a classic input device, it nevertheless is vulnerable to the same types of attacks.

Software key loggers are a form of sniffing that have always been a favorite hacker tool. Recently in New York, for example, an individual plead guilty in federal court to two counts of computer fraud and one charge of unauthorized possession of access codes for a scheme in which the individual planted a copy of a commercial keyboard sniffing program on computers at a well-known copy service firm. Using his makeshift surveillance mechanism, the individual captured over 450 on-line banking passwords and user names from unsuspecting customers. He then used the victims' financial information to open new accounts under their names, and then siphon money from their legitimate accounts into the new, fraudulent ones. Apart from the criminal activities of the individual, the copy service firm itself is potentially open to liability for failure to adequately protect its equipment from such activities. Given the increasing popularity of Internet cafes, the risk for this type of fraud can be expected to grow.

Recently, in response to considerable advances in the detection and removal of software key loggers, several hardware-based key loggers have appeared on the market. Consider, for example, the dongle-style sniffer/logger device that may be ordered off of the Internet today. KEYKatcher is one of the more popular ones. To use the device, a malicious user secretly attaches it to a keyboard by placing it in-line with the keyboard cord. The dongle includes memory that allows the device to record all of the keystrokes of other unsuspecting users. Later, the malicious user removes the device and extracts all of the recorded keystrokes from the dongle memory using custom software (e.g., dumps the recorded keystrokes to a text file). In this manner, a malicious user may easily use the device to "sniff" all of the keyboard input of other unsuspecting users. Unlike software-based key loggers, once a hardware-based key logger is installed, it is very difficult to detect in software.

Stated generally, the problem applies to any device or mechanism that transmits data or information into a given computer system. However, the problem is most severe with detachable devices. Since detachable devices lack the degree of physical security that non-detachable devices enjoy, they present a greater opportunity for an unauthorized and undetected entity or actor to intervene in the communication channel or even replace the communication channel. In contrast, non-detachable devices have at least some degree of protection. For example, a built-in internal hard drive in a laptop computer is probably relatively safe, given the physical barrier that must be breached in order to gain physical access to that device. All told, detachable devices or mechanisms pose the greater security risk because they lack this protective physical barrier. The peripheral devices that pose this risk include any detachable device or mechanism capable of providing a data feed, including such common devices as detachable keyboards, pointing/mouse devices, microphones, memory cards, USB storage devices, web cameras, and the like.

With these types of devices or mechanisms, two major threats are posed. First, communications between the peripheral device and a given computer may be intercepted in an unauthorized manner. This would include, for example, the above-mentioned "sniffing" approach. Second, the peripheral device may be impersonated. Here, the computer will mistakenly authenticate the impersonator as legitimate, when in fact it is not.

Although these threats are now recognized, the only solution offered to date has been in terms of some type of physical security that prevents individuals from plugging in peripheral devices. The most commonly proposed defense against installing hardware key loggers has been to physically secure the keyboard and mouse cables so that the hacker cannot easily insert the hardware key logger. For example, a keyboard/mouse input jack may be secured with some type of physical locking device. These mechanical barriers only provide a limited solution. In a large organization, for example, the burden of tending to a large number of mechanical locks makes the approach impractical (especially if existing hardware needs to be retrofitted). Further, size limitations about what is practical for locking computer sockets and plugs would dictate using a relatively small locking device, one which would likely be easily defeated (e.g., using a bolt cutter). As yet another problem, such physical locks are not easily monitored. This is particularly a problem if the locks needed to be monitored at a remote site. A breach would likely only be detected very much after the fact. Given all these deficiencies, a better solution is sought.

In the current computing environment, computers (e.g., PCs) are configured to always trust all peripheral devices by default. Further, there is no existing infrastructure in any of the commercially available operating systems today that requires re-authentication of every single peripheral device each time it is attached to a computer. What is needed is a system implementing methodology that solves the basic problem of establishing and maintaining trust between a computer and all of the peripheral devices that may be plugged into it. In this manner, a growing source of security problems may be solved.

SUMMARY OF INVENTION

A security system with methodology for defending against security breaches of peripheral devices is described. In one embodiment, for example, a method of the present invention is described for protecting a computer from security breaches involving devices that may be attached to the computer, the method comprises steps of: when a device is first attached to the computer, specifying authorization information indicating that the device is allowed to communicate with the computer; detecting detachment of the device from the computer; updating the authorization information to indicate that the device is no longer authorized to communicate with the computer; and upon reattachment of the device, blocking communication with the device while the device remains unauthorized, thereby preventing a security breach involving the device.

In another embodiment, for example, a system of the present invention is described for protecting a computer from security breaches involving devices that may be attached to the computer, the system comprises: an agent module for specifying authorization information indicating that the device is allowed to communicate with the computer when a device is first attached to the computer; for detecting detachment of the device from the computer; and for updating the authorization information to indicate that the device is no longer authorized to communicate with the computer; and a filter module for blocking communication with the device while the device remains unauthorized, thereby preventing a security breach involving the device.

In yet another embodiment, for example, a method of the present invention is described for securing a computer from security breaches involving peripheral devices, the method comprises steps of: specifying a password to be supplied for authorizing a peripheral device to communicate with the computer; detecting each attachment of the peripheral device to the computer; upon each attachment, blocking communications with the peripheral device until the password is supplied; and if the password is supplied, permitting the peripheral device to communicate with the computer.

DETAILED DESCRIPTION

Glossary

The following definitions are offered for purposes of illustration, not limitation, in order to assist with understanding the discussion that follows.

FireWire (IEEE 1394): This is a very fast external bus standard that supports data transfer rates of up to 400 Mbps (in 1394a) and 800 Mbps (in 1394b).

IDE: Abbreviation for Integrated Drive Electronics. An IDE interface is an interface for mass storage devices, in which the controller is integrated into the disk or CD-ROM drive. IDE is increasingly becoming subsumed by ATA, "Advanced Technology Attachment," a disk drive implementation that integrates the controller on the disk drive itself.

Parallel port: A parallel port is an interface for connecting an external device such as a printer. On PCs, the parallel port uses a 25-pin connector (type DB-25) and is used to connect printers, computers, and other devices that need relatively high bandwidth. Newer types of parallel port include the EPP (Enhanced Parallel Port) and the ECP (Extended Capabilities Port). Both of these parallel ports support bi-directional communication and transfer rates up to ten times faster than traditional parallel ports.

RS-232: Short for recommended standard 232C, a standard interface approved by the Electronic Industries Alliance (EIA) for connecting serial devices. In 1987, the EIA released a new version of the standard and changed the name to EIA-232-D.

SCSI: Acronym for small computer system interface. Pronounced "scuzzy," SCSI is a parallel interface standard used by Apple Macintosh computers, PCs, and many UNIX systems for attaching peripheral devices to computers. Nearly all Apple Macintosh computers come with a SCSI port for attaching devices such as disk drives and printers. Users can attach many devices to a single SCSI port, so that the SCSI port functions really as an I/O bus rather than simply as an interface.

USB: Short for Universal Serial Bus, an external bus standard that supports data transfer rates of 12 Mbps. A single USB port can be used to connect up to 127 peripheral devices, such as mice, modems, and keyboards. USB also supports Plug-and-Play (PnP) installation and hot plugging.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., For Desktop and Server Computers)

Figure 1:
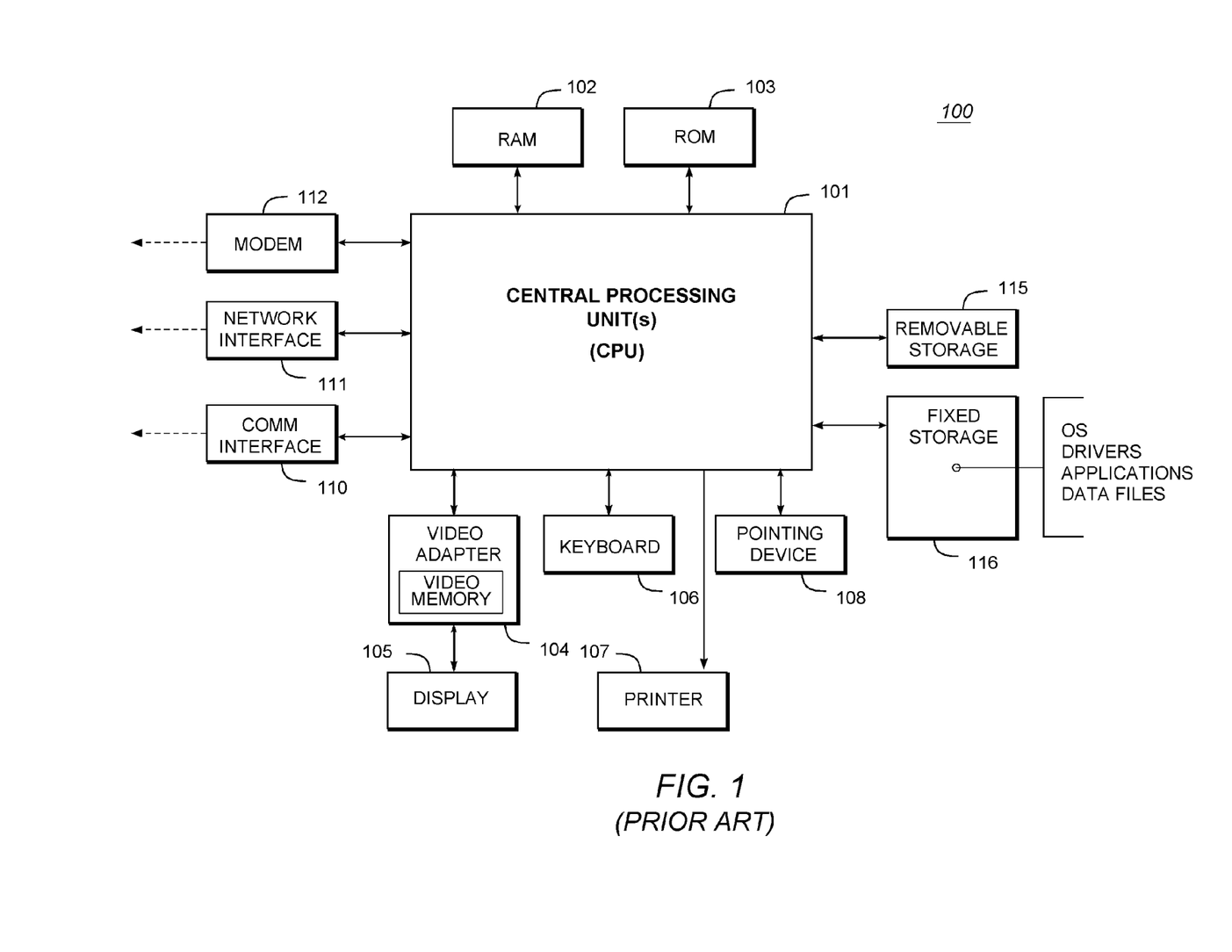
FIG. 1 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
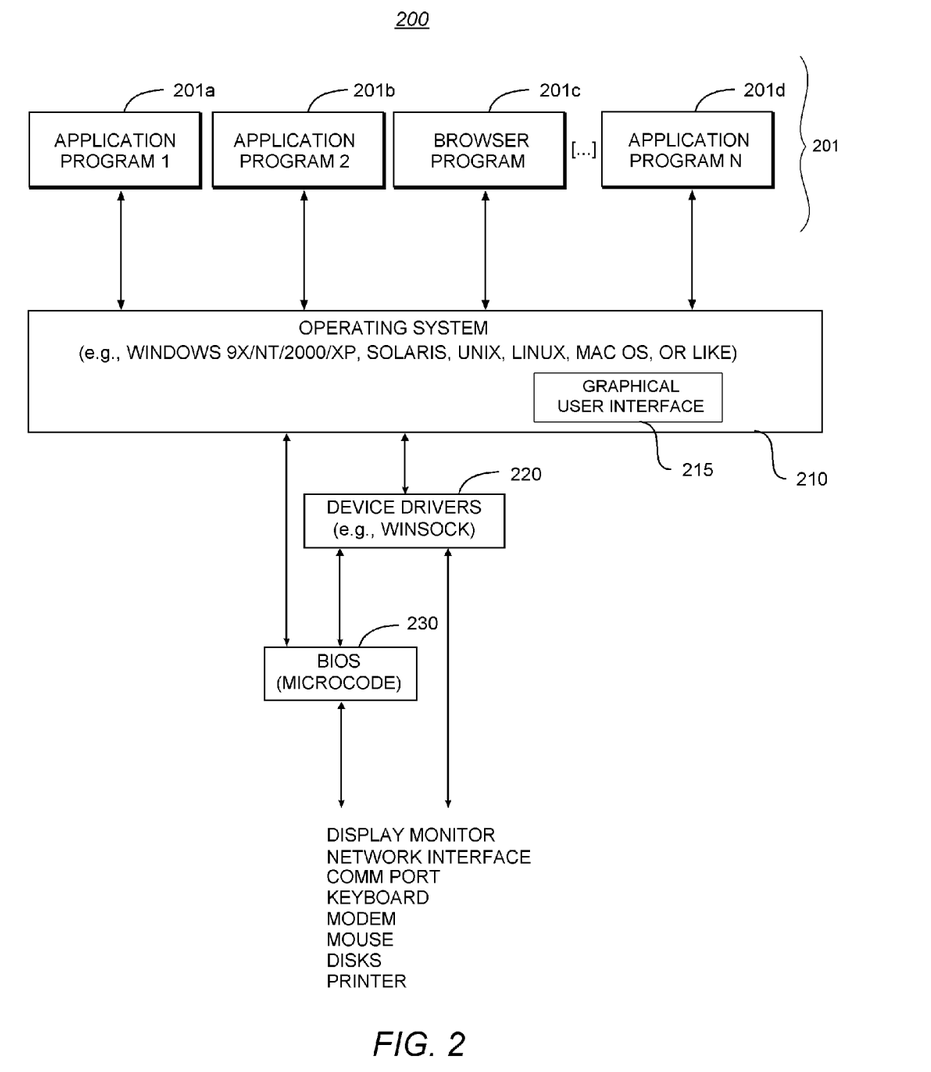
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying computer components that may be employed for implementing the present invention. For purposes of discussion, the following description will present certain examples in which it will be assumed that one computer system may communicate with another computer system, such as a desktop computer ("client") computer system that communicates with a remote computer system offering at least one service ("server"). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below, including peer-to-peer configurations or the like.

Overview of Defending Against Security Breaches of Peripheral Devices

Detection of Detachment and Reattachment

Given the limitations of current hardware/physical lock security approaches, a software-based defense would clearly be preferable. In accordance with the present invention, a software agent works in conjunction with a computer's underlying operating system to detect the attachment or the detachment/reattachment of any security-sensitive peripheral device, especially including an input device such as a keyboard, mouse, microphone, webcam, or the like. More particularly, the agent effectively "locks down" (i.e., blocks) the peripheral device when it is initially attached or when it is detached and then plugged back in, and requires an authorized party to supply a password in order to enable (or re-enable) the device. Of course, the password will only be known to such authorized individuals as the system administrator or authorized user. Optionally, a system administrator may be notified of the occurrence of a peripheral device disconnection event and reconnection event, and have the ability to re-enable the input device(s) remotely (or allow the device to remain blocked).

The approach of the present invention takes advantage of the fact that, in many modern operating systems, it is possible to detect in software in real-time that a given peripheral device has been attached, or even reattached. Microsoft Windows, for example, includes a "plug and play" interface layer that handles all modern peripheral devices in a Windows environment. Other operating systems, such as Linux or Mac OS-X, have similar interfaces. In fact, all of the interfaces (PS/2, USB, COM ports) most commonly used in computer systems today allow some sort of software process to detect the loss of peripheral device connection. If necessary or desired for a particular deployment, however, a special input device driver or a custom driver I/O filter may be employed.

Given these peripheral device interfaces that exist in modern operating systems, a peripheral device security monitoring module constructed in accordance with the present invention may watch or monitor such an interface for the occurrence of an attachment event. An attachment event may consist of initial attachment of a new device or detachment/reattachment of a previously-seen peripheral device. As soon as a peripheral device is detached, the security module may revert or default to no longer trusting the peripheral device. In particular, the security module no longer trusts the peripheral device once it is reattached since, during its detachment, someone could have installed something on the device or otherwise modified it in a manner that compromises the trustworthiness of the device (e.g., such as installing a sniffer on a keyboard device). While the discussion which follows will focus on securing peripheral devices against attack, those skilled in the art will readily appreciate that the present invention can easily be adapted to securing network cables against similar types of attacks, such as preventing installation of hardware Ethernet sniffers, as well as protecting other device input/output (I/O) ports or interfaces of computer systems (e.g., parallel (printer) ports, RS-232 ports, FireWire (IEEE 1394) ports, Ethernet ports, SCSI ports, IDE bus interfaces, or the like).

Operating systems such as Microsoft Windows do not detect attachment/detachment of peripheral devices when a given computer is powered down. Note, however, that when the computer is next powered up, the operating system requires an administrator or user password. Therefore, by default, a re-powered computer will not be accessible and its peripheral devices cannot be used until such time as the appropriate administrator or user password is entered. In a public setting, such as a public kiosk or a publicly-accessible service center, the appropriate password will not be available for an unauthorized party to reboot the operating system upon powering up a computer. In effect, in order for one to power cycle a computer, that individual must have appropriate access privileges and, thus, effectively becomes the appropriate agent for re-authenticating any peripheral devices attached at the time of computer system power up. In particular, the operating system has to authenticate the user that is attempting to power up the computer system.

Device Authorization

The safest course of action, with an untrusted device, is to prevent any data input from that device after it has been reattached, until such time (if any) that an authorized party reactivates the peripheral device. In the currently preferred embodiment, the security system of the present invention maintains a basic flag for each attached peripheral device indicating whether a given device is trusted or not. As soon as the device is disconnected, it becomes untrusted, whereupon its corresponding flag is set. In order to re-enable trust, the security system includes a mechanism, which may be implemented locally and/or remotely, to exclude or reallow data input from the device.

After a peripheral device is attached (i.e., attached initially or reattached), authorization is required. It should be noted that in the following discussion references to the term "attachment" include both initial attachment and reattachment of a device. Similarly, unless otherwise indicated the term "authorization" refers to either initial authorization of a device or any subsequent reauthorization of the device (e.g., after the device has been detached and then reattached). When a device is attached an appropriate user or entity (e.g., network administrator or authorized user) is alerted that the particular device has just been attached and that it needs to be authorized. In the case of a local user, the security system of the present invention may prompt the user for a device-specific password. At this point, the user may type in the password, and the security module, which is monitoring the keystroke input, will be able to recognize input of a correct password. As soon as the correct password is entered, the security module may unlock the device—that is, reactivate the data stream for the peripheral device (coming from the device into the computer).

In the case of a remote user or entity, the above authorization/re-authorization sequence happens remotely. For example, the network administrator may be alerted remotely of the occurrence (e.g., via network alert, e-mail, a pager, or the like). The administrator has the option of either reactivating the device from the remote location, or he or she may decide to leave the device deactivated until such time that the device may be physically inspected for security breach by the administrator or other authorized user. In this matter, remote re-authorization operates like home burglar alarm monitoring systems. When an alarm is tripped, the alarm monitoring company may attempt to verify whether the event is a false alarm or not. In the instance that the alarm monitoring company cannot verify that the alarm event is false (i.e., is unable to resolve the alarm state), the company notifies the police to go out to the site for physical inspection of any security breach.

System Components

Figure 3:
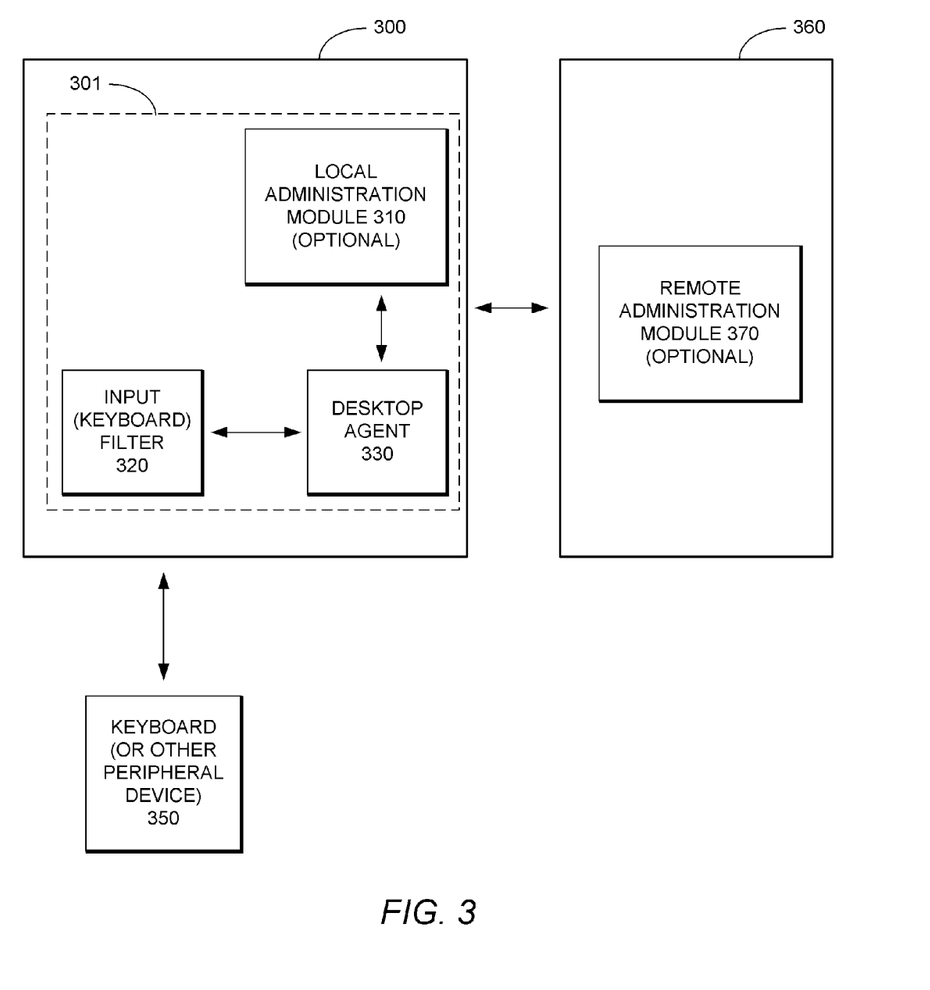
FIG. 3 is a high-level block diagram of a software-based security system, which may be embodied on a computer system running the Microsoft Windows operating system (e.g., such as the above-described system).

FIG. 3 is a high-level block diagram of a software-based security system 301, which may be embodied on a computer system running the Microsoft Windows operating system (e.g., such as the above-described system 100). As shown, the security (defense) system 301 includes an input filtering module 320 and a desktop agent module 330, typically operated on a single computer (e.g., computer 300). Locally, the system 301 may (optionally) include a local administration module 310 also residing on the computer 300. The system 301 may be extended to include an optional remote administration module 370, running on a remote machine 360 (e.g., server computer, or another peer computer). In operation, the system 301 serves to protect the computer 300 from security breaches occurring via peripheral devices, such as keyboard device 350.

In the configuration shown, computer 300 is the "protected computer" and thus is running the desktop agent 330 and the input filter 320. The agent 330 is watching for events of disconnection and reconnection of peripheral devices, such as the keyboard device 350 illustrated in FIG. 3. The input filter 320 will collect all of the peripheral device input (e.g., keystrokes from the keyboard 350) in an isolated buffer, when the system is operating in an untrusted mode (e.g., when the keyboard 350 is untrusted). Thus, the buffer serves as a staging area that allows the local administration module 310 to determine whether the user or administrator has entered an appropriate password for re-authenticating a given peripheral device. During this time (i.e., untrusted mode), all other input from the untrusted peripheral device is otherwise blocked. Upon receiving the appropriate password input, the local administration module 310 will re-authenticate the peripheral device and allow its input to pass through the filter and on into the computer 300. Thus, for example, upon receiving the appropriate password for reauthorizing the keyboard 350, the filter will allow keyboard input (keystrokes) to pass through and on into the computer 300.

The above example describes a situation in which the keyboard is the peripheral device that is disconnected and reconnected to the computer 300. When the keyboard is reconnected, the input filter collects the keystrokes in a buffer to look for the appropriate password amongst (potentially) untrusted input. It should be noted, however, that in the event that the peripheral device that is reconnected to the computer is a device other than the keyboard (e.g., a mouse input device), then the input from the keyboard itself (e.g., to type in the password) does not necessarily need to be filtered or quarantined. For example, the keyboard may remain connected and in a "trusted" status while the mouse input device is disconnected and reconnected. In this case keyboard input from the "trusted" keyboard does not need to be filtered.

In certain deployments, it may not be desirable or even possible to locally reactivate/re-authorize peripheral devices. In those instances, the remote administration module 370 is employed as part of the security system 301. In this configuration, events about the disconnection and reconnection of peripheral devices (i.e., attachment events) are reported to the remote administration module 370 via a connection between the computer 300 and the computer 360 (e.g., via Internet connectivity or the like). Preferably, the communication of the attachment events (i.e., the disconnection and reconnection of peripheral devices) is done in a secure manner. The actual technique used for secure communication depends on the underlying network that the system is deployed on. In a deployment with Internet connectivity, for example, SSL (Secure Socket Layer) or VPN (Virtual Private Network) mechanisms may be used to establish secure communication with the remote administration module 370. In a closed network, on the other hand, a private line of communication may be employed. At the remote administration module 370, the network administrator will have the option of reactivating the peripheral device access remotely or initiating physical inspection of the device (e.g., device 350) and the computer (e.g., computer 300) before reactivating the device.

A useful configuration to deploy is one that employs both the local administration module 310 and remote administration module 370. With this configuration, the network administrator may easily delegate the re-authentication to an authorized user on site. The authorized user will be given sufficient authorization to reactivate the peripheral device on site. In that instance, the on-site authorized user types in the appropriate password for the peripheral device, whereupon the local administration module 310 receives the password and reactivates the device. This type of deployment is useful in a managed service provider environment, where there is a central administration console for several satellite locations. For example, a photocopy service provider could use a central administrator to control computers at various retail locations. The central administration console allows for the easy consolidation of all information and event reporting. However, this is coupled with on site personnel (e.g., photocopy service provider employees) who are authorized to check the physical state of machines and re-allow connection of peripheral devices.

Detailed Operation

The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Figure 4:
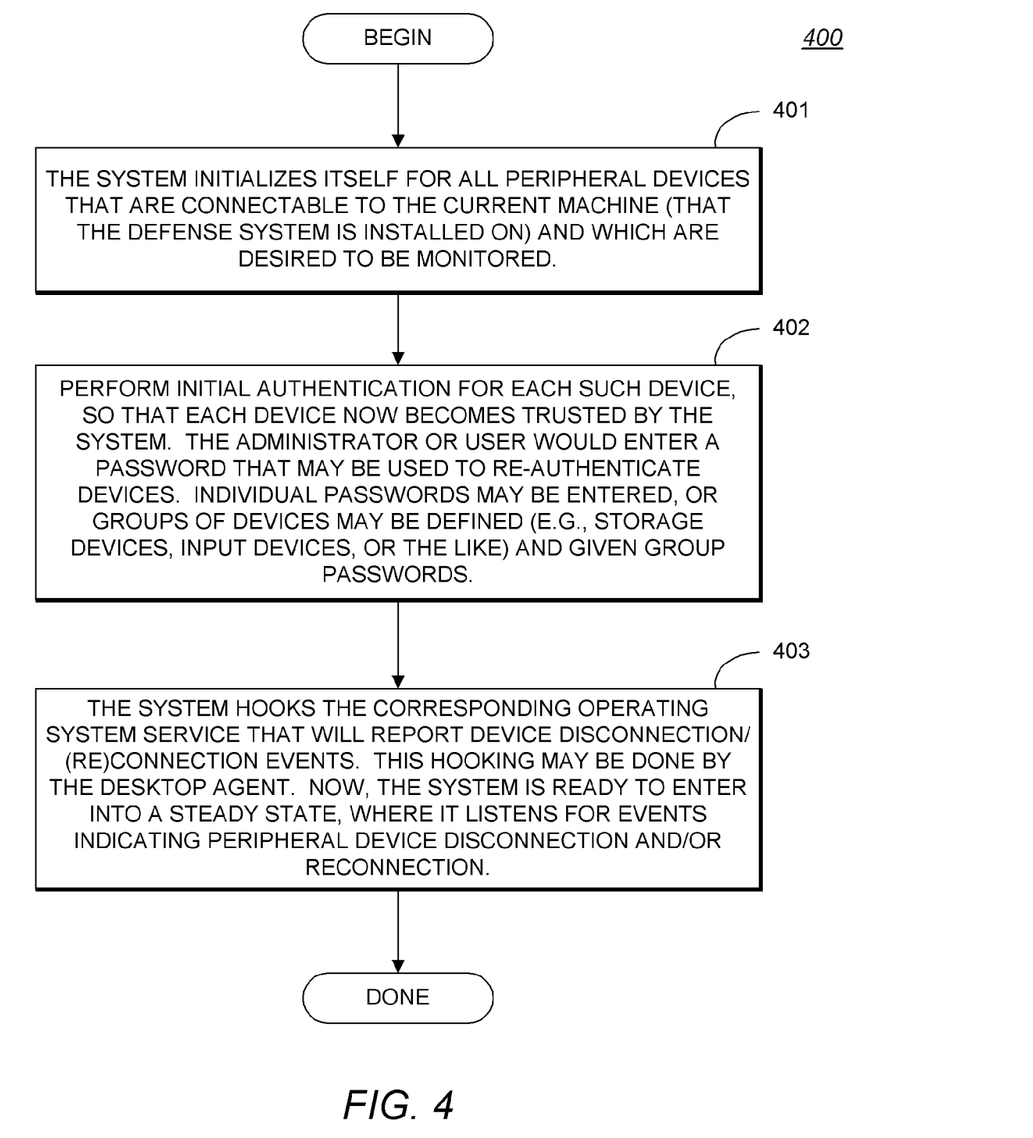
FIG. 4 is a flowchart illustrating overall operation of the defense system of the present invention.

FIG. 4 is a flowchart 400 illustrating overall operation of the defense system of the present invention. The steps are as follows. At step 401, the system initializes itself for all peripheral devices. As previously stated, this may be extended to include all devices that are "connectable" to the current machine that the security system is installed on and which are desired to be monitored (e.g., devices connected via parallel port, RS 232 port, FireWire (IEEE 1394) port, SCSI port, IDE bus interface, or like). Step 402 indicates that there is an initial authentication for each such device, so that each device now becomes "trusted" by the system. As part of this step, or as part of the previous step, the administrator or user would enter a password that may be used to re-authenticate devices. Individual passwords may be entered, or groups of devices may be defined (e.g., "storage devices," "input devices," or the like) and given group passwords. At step 403, the system "hooks" the corresponding operating system service that will report device disconnection/(re)connection events. This hooking may be done by the desktop agent 330, and/or the functionality may be embodied in the input filter 320. Now, the system is ready to enter into a steady state, where it listens for events indicating peripheral device disconnection and/or reconnection.

Hooks, such as the one referenced above, are used to trap all events in the Windows environment. More particularly, a hook is a mechanism by which a function can intercept events (messages, mouse actions, keystrokes, or the like) before they reach an application. The function can act on events and, in some cases, modify or discard them. The following is a simple function that installs a hook to trap keyboard events and save the keystrokes to a text file.

```
1: BOOL___declspec(dllexport)___stdcall installhook( )
2: {
3:      f1=fopen("c:\\report.txt","w");
4:      fclose(f1);
5:      hkb=SetWindowsHookEx(WH__KEYBOARD,
        (HOOKPROC)KeyboardProc,hins,0);
6:
7:      return TRUE;
8: }
```

A callback function, specified in the above hooking call, is to be invoked upon the occurrence of the trapped event.

```
1: LRESULT___declspec(dllexport)___stdcall CALLBACK
KeyboardProc(int
nCode,WPARAM wParam,
2:                       LPARAM lParam)
3: {
4:      char ch;
5:      if (((DWORD)lParam & 0x40000000) &&(HC__ACTION=
=nCode))
6:      {
7:          if ((wParam==VK__SPACE)||(wParam==VK__RETURN)
||(wParam>=0x2f)
&&(wParam<=0x100))
8:          {
9:              f1=fopen("c:\\report.txt","a+");
10:             if (wParam==VK__RETURN)
11:             {
12:                 ch='\n';
13:                 fwrite(&ch,1,1,f1);
14:             }
15:             else
16:             {
17:                 BYTE ks[256];
18:                 GetKeyboardState(ks);
19:
20:                 WORD w;
21:                 UINT scan=0;
22:                 ToAscii(wParam,scan,ks,&w,0);
23:                 ch = char(w);
24:                 fwrite(&ch,1,1,f1);
25:             }
26:             fclose(f1);
27:         }
28:     }
29:
30:     LRESULT RetVal = CallNextHookEx( hkb, nCode,
wParam, lParam );
31:     return RetVal;
32: }
```

Functions that receive events are called filter functions and are classified according to the type of event they intercept. For example, a filter function might want to receive all keyboard or mouse events. For Windows to call a filter function, the filter function must be installed—that is, attached to a Windows hook, such as a keyboard hook. If a hook has more than one filter function attached, Windows maintains a chain of filter functions. The most recently installed function is at the beginning of the chain, and the least recently installed function is at the end. When a hook has one or more filter functions attached and an event occurs that triggers the hook, Windows calls the first filter function in the filter function chain. This action is known as calling the hook. For example, if a filter function is attached to the Computer Based Training (CBT) hook and an event that triggers the hook occurs, such as a window is about to be created, Windows calls the CBT hook by calling the first function in the filter function chain. To maintain and access filter functions, one uses the "SetWindowsHookEx" (illustrated above) and the "UnhookWindowsHookEx" Windows API function calls.

The Windows "IoRegisterPlugPlayNotification" routine registers a device driver callback routine to be called when a Plug-and-Play (PnP) event of the specified category occurs. For example, in order to be notified of keyboard disconnects, the desktop agent module 330 defines a notification routine as follows:

```
 1: NTSTATUS KeyboardClassPlugPlayNotification
 2: (
 3:     IN PTARGET_DEVICE_REMOVAL_NOTIFICATION
NotificationStructure,
 4:     IN PDEVICE_EXTENSION Port
 5: )
 6: {
 7:     NTSTATUS   status = STATUS_SUCCESS;
 8:     PVOID      notify = NULL;
 9:
10:     PAGED_CODE ( );
11:
12:     ASSERT (Globals.GrandMaster->Self == Port->True
ClassDevice);
13:
14:     if (IsEqualGUID ((LPGUID)
15: &(NotificationStructure->Event),
(LPGUID)&GUID_TARGET_DEVICE_QUERY_REMOVE
16: ))
17:     {
18:         // react to the disconnect notification, then close the
device
19: port
20:         <...>
21:         // close the handle
22:         status = KeyboardClassEnableGlobalPort (Port,
FALSE);
23:     }
24:     else
25:         if(IsEqualGUID
26: ((LPGUID)&(NotificationStructure->Event),
(LPGUID)&GUID_TARGET_DEVICE_REM
27: OVE_COMPLETE))
28:     {
29:         // handle device disappearance
30:         notify = InterlockedExchangePointer
31: (&Port->TargetNotifyHandle,NULL);
32:         if (NULL != notify)
33:         {
34:             IoUnregisterPlugPlayNotification (notify);
35:             status = KeyboardClassEnableGlobalPort (Port,
    FALSE);
36:         }
37:     }
38:     return status;
39: }
```

The agent may then register this routine by calling "IoRegisterPlugPlayNotification" as follows.

```
          1: status = IoRegisterPlugPlayNotification
          2: (
          3:    EventCategoryTargetDeviceChange,
          4:    0,
          5:    *File,
          6:    Port->Self->DriverObject,
          7:    KeyboardClassPlugPlayNotification,
          8:    Port,
          9:    &Port->TargetNotifyHandle
         10: );
```

"Port" and "File" were previously obtained from the instance of keyboard device object.

Figure 5A:
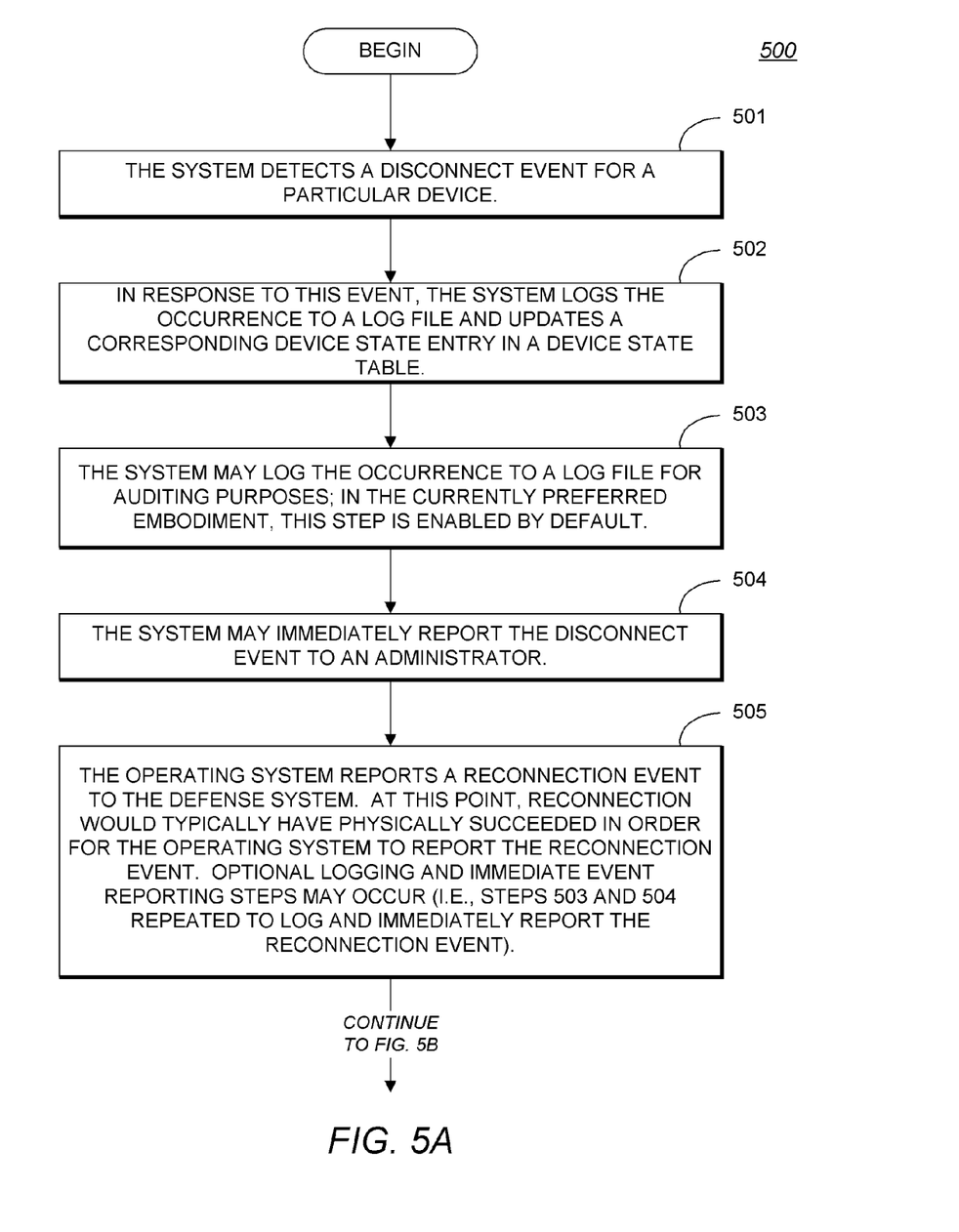
FIGS. 5A-B comprise a single flowchart illustrating operation of the system upon receipt of an event indicating disconnection/detachment of a peripheral device.
Figure 5B:
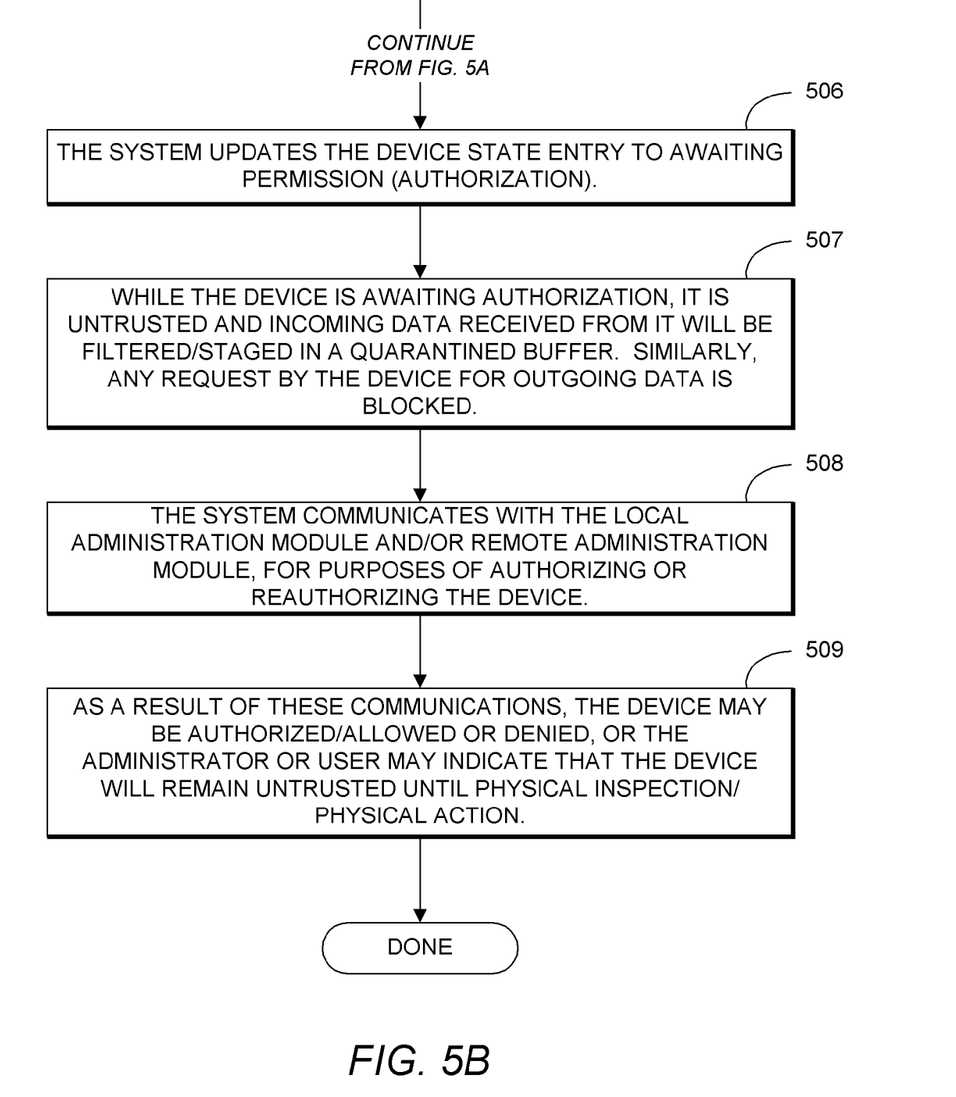

FIGS. 5A-B comprise a single flowchart 500 illustrating operation of the system upon receipt of an event indicating disconnection/detachment of a peripheral device. The method of operation starts at step 501, with the system picking up a disconnection event for a particular device. For example, in the embodiment shown in FIG. 3, every time the peripheral device 350 (e.g., keyboard) is disconnected, the filter module 320 receives notification of the event, which has been trapped by the security system by virtue of hooking the corresponding Windows keyboard driver. In response to this event, the system logs the occurrence to a log file and updates a corresponding device state entry in a device state table, at step 502. For example, in the embodiment shown in FIG. 3, the filter 320 notifies the desktop agent 330 that the disconnect event occurred, and in response the desktop agent sets its internal device table state to DISCONNECTED. As an optional step, indicated at step 503, the system may log the occurrence to a log file for auditing purposes; in the currently preferred embodiment, this step is enabled by default. In a similar manner as an optional step, the system may immediately report the disconnect event to an administrator, as indicated a step 504. In the embodiment shown in FIG. 3, for example, the desktop agent 330 notifies the remote administration module 370, thereby allowing the network administrator to become aware of the occurrence. Typically, this operational step would be employed in instances where the system is configured to communicate with the remote administration module 370.

The following steps deal with occurrence of a reconnection. At step 505, the operating system reports a reconnection event to the security (defense) system. At this point, reconnection would typically have physically succeeded in order for the operating system to report the reconnection event. For example, in the embodiment shown in FIG. 3, the filter 320 notifies the desktop agent 330 when the peripheral device 350 (e.g., keyboard) is reconnected. However, because the desktop agent's internal state for the keyboard device is set to DISCONNECTED, all subsequent keystrokes are intercepted by the keyboard filter and forwarded to protected area for processing by the desktop agent (e.g., to determine entry of a valid password for unlocking the device). Optional logging and immediate event reporting steps may occur (i.e., steps 503 and 504 repeated to log and immediately report the reconnection event).

At step 506, the security system updates the device's internal state entry to AWAITING_PERMISSION, thereby indicating that the device is awaiting permission or authorization. While the device is awaiting authorization, it is "untrusted" and incoming data received from it will be filtered/staged in a quarantined buffer (accessible by the desktop agent) as shown at step 507. Similarly, any request by the device for outgoing data is blocked. At step 508, the system communicates with the local administration module and/or remote administration module, for purposes of authorizing or reauthorizing the device.

In the case of remote administration, the network administrator may choose to dispatch a technician or other authorized user to inspect the affected computer or he or she may decide to grant the permission remotely to restore keyboard input. As soon as the permission is granted, the remote administration module notifies the desktop agent which sets the device's internal state to CONNECTED and notifies the input filter that the keystrokes can now be allowed through the filter to the computer.

If the remote administration module is not present, then the local administration module is employed. Here, the desktop agent notifies the local administration module that the keyboard was reconnected and is awaiting a reactivation signal. Only someone in possession of the appropriate password will now be able to reactivate the peripheral device by typing a password. The quarantine buffer maintained by the desktop agent includes a sliding buffer of the last N keystrokes where N is the length of the password. Every time a new keystroke is received from the keyboard filter, the desktop agent places it into the buffer, calculates the hash value of the buffer and compares it with the stored hash of the password. Upon finding a match, the desktop agent resets the device's internal state to CONNECTED and notifies the input filter that the device's input (e.g., keystrokes from the keyboard) can now be allowed through.

Therefore, as a result of these communications, the device may be authorized/allowed or denied, or the administrator or user may indicate that the device will remain untrusted until physical inspection/physical action, as indicated at step 509. In a computer system subject to high security, step 509 may be augmented to treat the entire event as a security breach and shut down the computer's network node, thereby preventing access to other systems on the network. In extreme instances, the entire computer network could be shut down if desired, until the security breach is rectified.

While the invention is described in some detail with specific reference to a single-preferred embodiment and certain alternatives, there is no intent to limit the invention to that particular embodiment or those specific alternatives. For instance, apart from the classic USB-connectable peripheral devices, other devices that connected to the computer may be monitored and secured, such as devices connected via parallel port, RS 232 port, FireWire (IEEE 1394) port, SCSI port, IDE bus interface, or the like. Therefore, those skilled in the art will appreciate that modifications may be made to the preferred embodiment without departing from the teachings of the present invention.

What is claimed is:

1. A method for protecting a computer from security breaches involving a hardware-based key logger installed between the computer and an attached input device, the method comprising:
   when the computer is first powered on, storing authorization information received from an administrative user to indicate that the input device is authorized to communicate with the computer;
   detecting a potential tampering attempt by an unauthorized user comprising detachment of the input device from the computer, installation of a hardware-based key logger, and reattachment of the input device, so that the hardware-based key logger is installed between the computer and the input device;
   requiring entry of a password for authorizing the input device;
   if the required password is entered, authorizing the input device to communicate with the computer and, otherwise, continuing to block communication from the input device to the computer;
   storing authorization information indicating whether or not the input device is allowed to communicate with the computer;
   detecting detachment of the input device from the computer;
   when said potential tampering attempt is detected, updating the authorization information to indicate that the input device is no longer authorized to communicate with the computer; and
   upon said reattachment of the input device, blocking communication from the input device to the computer until the input device is again authorized.

2. The method of claim 1, further comprising:
   specifying a password for authorizing the device.

3. The method of claim 1, wherein said input device comprises a keyboard device.

4. The method of claim 1, wherein the input device is attached to the computer via a port.

5. The method of claim 4, wherein the port is a selected one of a USB port, an RS-232 port, a parallel port, a SCSI port, and an IEEE 1394 port.

6. The method of claim 1, wherein said input device comprises a keyboard device and wherein said blocking step includes blocking input from the keyboard device.

7. The method of claim 6, wherein said blocking step includes blocking any request by the keyboard device for outgoing data from the computer.

8. The method of claim 7, further comprising:
   upon reattachment of the keyboard device, trapping keystrokes from the keyboard device.

9. The method of claim 8, further comprising:
   determining whether keystrokes trapped from the keyboard comprise a password that may be used to authorize the device.

10. The method of claim 1, wherein said input device comprises a detachable storage device and wherein said blocking step includes blocking any data stream from the storage device.

11. The method of claim 1, wherein said blocking step includes:
    blocking communication from the computer to the input device while the input device remains unauthorized.

12. The method of claim 1, further comprising:
    receiving input of a password to be utilized for authorizing the input device.

13. The method of claim 12, wherein the password comprises an input device specific password input by an authorized user.

14. The method of claim 1, further comprising:
    upon detecting detachment of the input device from the computer, generating an alert that reports the detachment.

15. The method of claim 14, wherein the alert is automatically transmitted to a system administrator.

16. The method of claim 14, wherein the alert is automatically transmitted to a remote administration module operating on a different computer.

17. The method of claim 16, further comprising:
    receiving authorization from a remote administration module; and thereafter
    allowing communication with the input device.

18. The method of claim 1, wherein said detecting step includes:
    specifying an operating system hook that allows attachment and detachment of input devices to be detected.

19. The method of claim 1, wherein said updating step includes:
    updating the authorization information to indicate that the input device is currently untrusted.

20. The method of claim 1, wherein said updating step includes:
    treating the detachment as a security breach and blocking communication with a network node that the computer resides on.

21. A non-transitory computer-readable medium having processor-executable instructions for performing the method of claim 1.

22. The method of claim 1, further comprising:
downloading a set of processor-executable instructions for performing the method of claim 1 on a computer having a processor and a memory.

23. A system for protecting a computer from security breaches involving an unauthorized user installing a hardware-based key logger between a computer and an attached peripheral device, the system comprising:
a computer having at least a processor and memory and including an operating system service that monitors connection and disconnection of peripheral devices that may be attached to the computer via an available external port;
a filter module for receiving notification of connection and disconnection events from the operating system service when peripheral devices are attached to and detached from the computer, including connection and disconnection events that occur during installation of a hardware-based key logger on a given peripheral device attached to the computer, reporting such connection and disconnection events, and blocking communication with the given peripheral device attached to the computer until communication with the given peripheral device is authorized; and
a desktop agent that determines, in response to reported connection events relating to a given peripheral device, whether or not the given peripheral device is authorized to communicate with the computer based on obtaining user input as to whether to allow communication with the given peripheral device, and for revoking the authorization of the given peripheral device to communicate with the computer in response to reported connection and disconnection events relating to the given peripheral device.

24. The system of claim 23, wherein the desktop agent includes:
program logic for specifying a password for authorizing the given peripheral device.

25. The system of claim 23, wherein the desktop agent includes:
program logic for specifying at least one user with sufficient privileges to authorize the given peripheral device.

26. The system of claim 23, wherein the given peripheral device is a keyboard device attached to the computer via a port.

27. The system of claim 26, wherein the port is a selected one of a USB port, an RS-232 port, a parallel port, a SCSI port, and an IEEE 1394 port.

28. The system of claim 23, wherein said given peripheral device comprises an input device and wherein the filter module includes program logic for blocking input from the input device.

29. The system of claim 28, wherein said input device is a keyboard device.

30. The system of claim 29, wherein said filter module includes:
program logic for trapping keystrokes from the keyboard device.

31. The system of claim 30, wherein said filter module further includes:
program logic for determining whether keystrokes trapped from the keyboard comprise a password that may be used to authorize the device.

32. The system of claim 23, wherein said given peripheral device comprises a detachable storage device and wherein the filter module includes program logic for blocking any data stream from the storage device.

33. The system of claim 23, wherein the filter module includes:
program logic for blocking communication from the computer to the given peripheral device until the given peripheral device is authorized.

34. The system of claim 23, further comprising:
program logic for receiving user input of a password for authorizing the given peripheral device, and thereafter
program logic for allowing communication with the given peripheral device.

35. The system of claim 34, wherein the password comprises a device specific password provided by an authorized user.

36. The system of claim 23, wherein said desktop agent further comprises:
program logic for generating, in response to reported disconnection events, an alert that reports the detachment.

37. The system of claim 36, wherein the alert is automatically transmitted to a system administrator.

38. The system of claim 36, wherein the alert is automatically transmitted to a remote administration module operating on a different computer.

39. The system of claim 23, further comprising:
program logic for receiving authorization of the given peripheral device from a remote administration module; and thereafter
program logic for allowing communication with the given peripheral device.

40. The system of claim 23, wherein the filter module includes:
program logic for specifying an operating system hook that intercepts connection and disconnection events from the operating system service allowing attachment and detachment of peripheral devices to be detected.

41. The system of claim 23, wherein the desktop agent includes:
program logic for notifying the filter module as to whether or not the given peripheral devices is authorized to communicated with the computer.

42. The system of claim 23, wherein the desktop agent includes:
program logic for treating a disconnection event as a security breach and blocking communication with a network node that the computer resides on.

* * * * *